R. H. HASSLER.
SHOCK ABSORBER FOR VEHICLES.
APPLICATION FILED APR. 25, 1917.
1,286,614.
Patented Dec. 3, 1918.
2 SHEETS—SHEET 1.
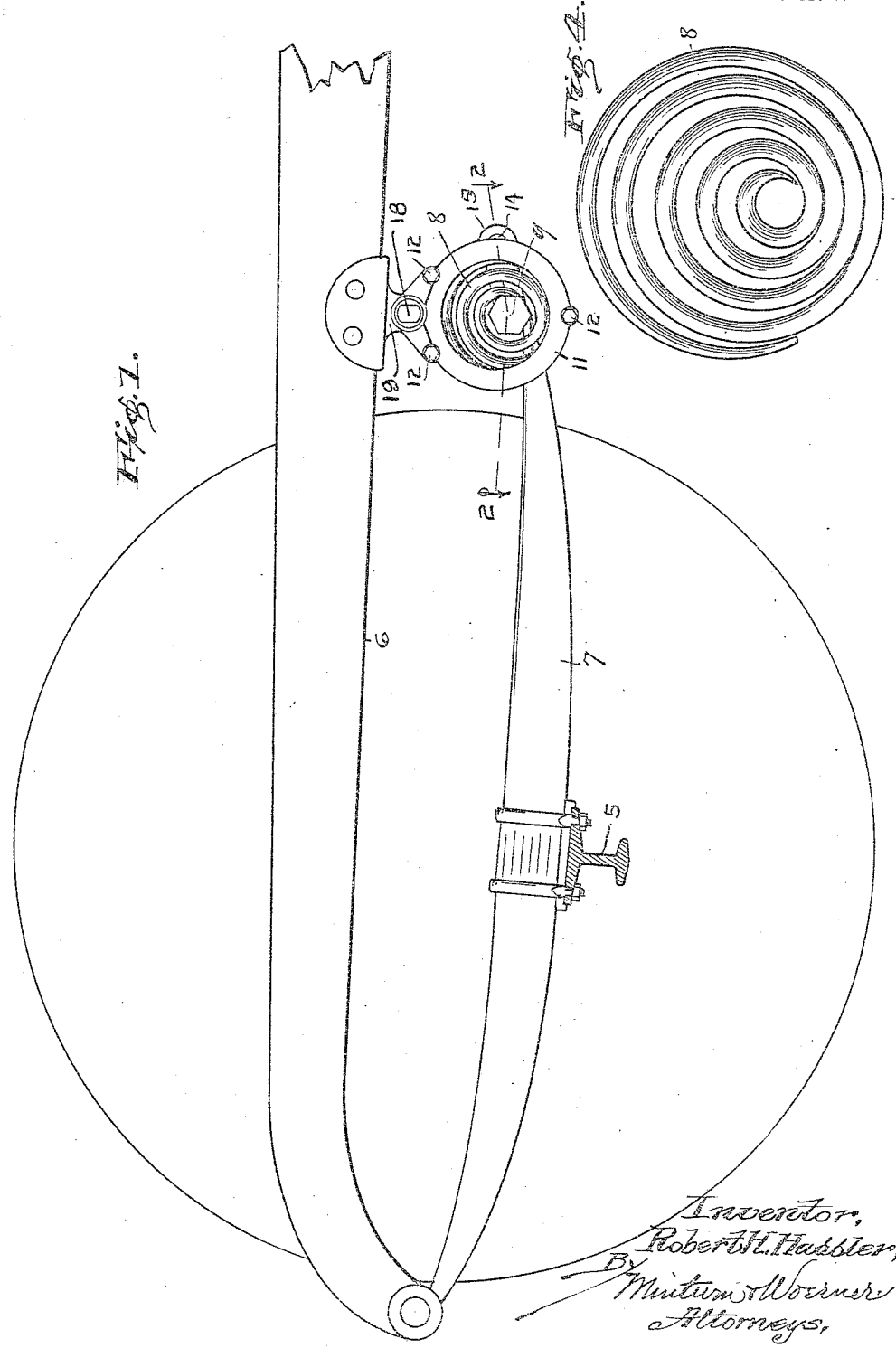

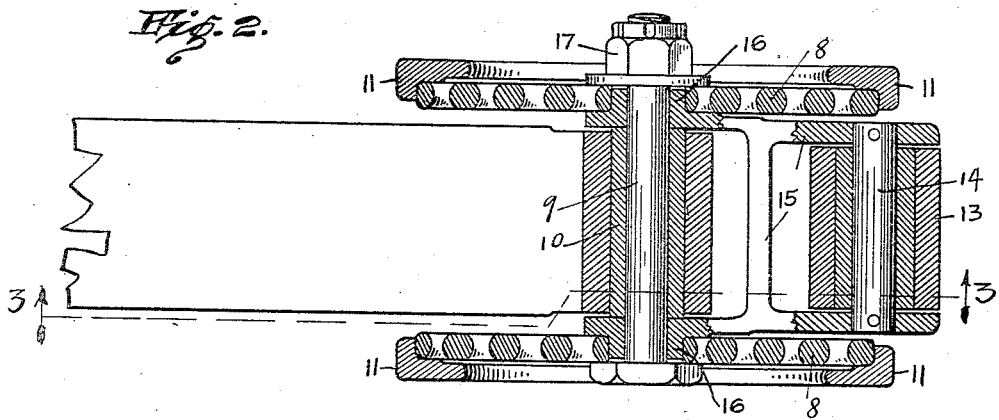
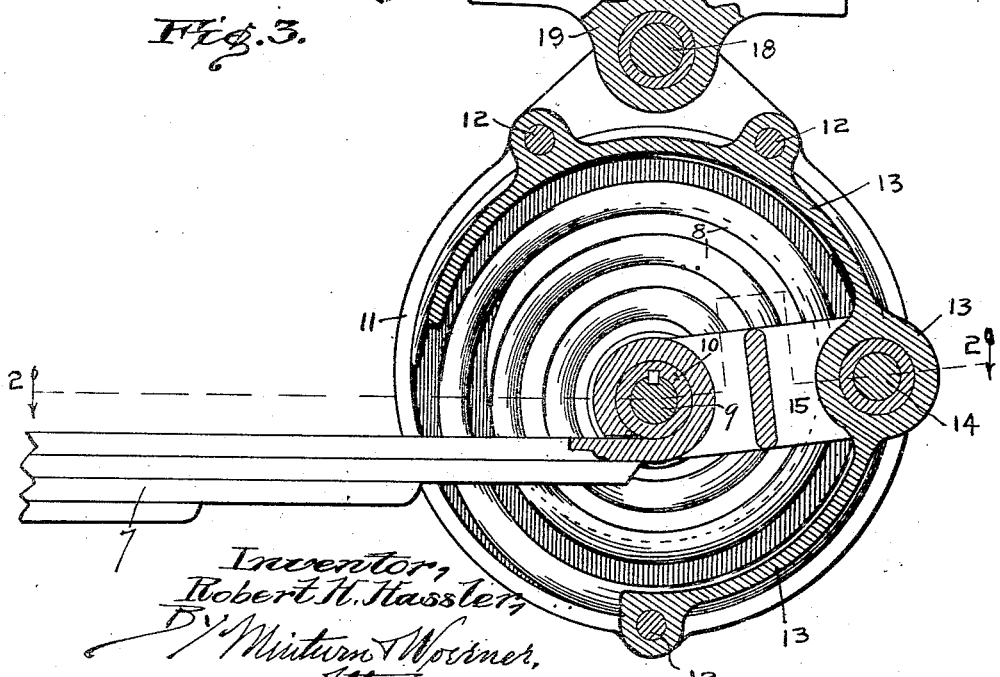

UNITED STATES PATENT OFFICE.

ROBERT H. HASSLER, OF INDIANAPOLIS, INDIANA.

SHOCK-ABSORBER FOR VEHICLES.

1,286,614.  Specification of Letters Patent.  Patented Dec. 3, 1918.

Application filed April 25, 1917. Serial No. 164,251.

*To all whom it may concern:*

Be it known that I, ROBERT H. HASSLER, a citizen of the United States, residing at Indianapolis, in the county of Marion and State of Indiana, have invented certain new and useful Improvements in Shock-Absorbers for Vehicles, of which the following is a specification.

The object of this invention is to add the resiliency of a spiral spring with its capacity to absorb sharp rapid vibration, as an auxiliary to a vehicle leaf spring, and to accomplish this with simplicity, compactness and a minimum of wearing parts, accompanied by freedom from rattle and noise.

The further object is to limit the action of the spiral and leaf springs to a motion in a vertical plane without side sway.

I accomplish the above and other objects which will hereinafter appear, by the mechanism illustrated in the accompanying drawings, in which—

Figure 1 is a view in side elevation of an end of the main frame of an automobile or truck with my invention applied thereto. Fig. 2 is a section on the line 2—2 of Figs. 1 and 3. Fig. 3 is a vertical section on the line 3—3 of Fig. 2 and Fig. 4 is a separate view of the spiral spring.

Like characters of reference indicate like parts throughout the several views of the drawings.

Referring to the drawings, 5 is the front axle, 6 the main frame and 7 a leaf spring of usual construction pivotally connected with the frame at one end and clipped to the axle in the usual manner near its middle. The other end of the leaf spring is connected with the frame 6 through the instrumentality of my invention, the embodiment of which, as here shown, comprises a pair of spiral springs 8, through the inner convolutions of which passes a bolt 9, which also passes through the eye at the end of the leaf spring, but is separated from direct contact with the latter by a spacing sleeve 10, slightly longer than the width of the leaf spring at this part.

The spiral springs are assembled in their respective housings 11. The housings are connected by bolts 12, here shown as three in number, and a spacers 13, located between the housings, through which the bolts pass.

A pin 14 is journaled in the spacer 13, and to its projecting ends an H-shaped link 15 is rigidly secured and therewith held in a manner to freely oscillate with the pin 14 as a fulcrum. Bosses 16 on the opposite stems of the link enter the inner convolutions of the springs 8, relieving the bolt 9 from direct bearing thereon of said inner convolutions. One end of the bolt 9 is headed and bears against the inner convolution of one spring 8, and the other end of the bolt is threaded to receive a nut 17, which bears against the outside of the inner convolution of the other spring 8, and by the intervention of the spacing sleeve 10, the inner convolutions of both springs 8 are clamped to link 15 by the tightening of nut 17.

The housings 11 are pivoted to the frame 6 by means of a pin 18, journaled in a hanger 19, depending from the frame 6.

The elongation of the leaf spring 7, as it deflects, is taken care of through the pivot action of the device as a whole on pin 18, and its journal in the bracket 19 on frame 6. A slight torsion takes place in spiral springs 8 as leaf spring 7 elongates, due to the inner convolution of spiral springs 8 being clamped endwise along pin 9 and spacer 10, in the eye of the leaf spring 7, by means of the nut 17 on the pin 9.

This construction limits the wearing parts to journals on the pins 18 and 14, and to motion between spacer 10 and the inside of the eye of leaf spring 7.

The restriction of movement to a vertical plane of the leaf spring 7, and spiral springs 8, is secured through the H-shaped link 15, which yokes over the end of leaf spring 7 at its inner end, and over the pin 14 at the outer end, leaving link 15 free to oscillate vertically in its journal on the pin 14 in the spacer 13, and in journal on the spacer 10 in the leaf spring 7, so that spiral springs 8 and leaf springs 7 are unrestricted as to motion in a vertical plane by link 15, but are restrained from moving in any other plane.

To obtain the maximum resiliency and action in the spiral springs 8 they are wound eccentrically and are mounted in housings 11, whereby the load acts in a direction opposite to the eccentricity, and the springs have all the clearance between the convolutions of the spiral on the unloaded side available for spring action.

The device may be applied to either or both ends of any type of conventional vehicle leaf spring at front or rear.

In the application to the ordinary spring suspension, the device takes the place of regular shackle links, thus eliminating parts to offset those added.

Having thus fully described my invention, what I claim as new and wish to secure by Letters Patent of the United States, is—

1. In a shock absorber, a leaf spring, a spiral spring pivoted at its axis to said leaf spring, an oscillating housing for confining said spiral spring, and means for pivotally connecting the axis of the spiral spring eccentrically with the oscillating housing.

2. In a shock absorber, a leaf spring, a spiral spring pivoted at its axis to said leaf spring, an oscillating housing for confining said spiral spring, an attaching element arranged eccentrically on said housing, and means for connecting the axis of the spiral spring with said connecting element.

3. In a shock absorber, a leaf spring, a spiral spring pivoted at its axis to said leaf spring, an oscillating housing, means on said housing to form a support for the circumferential surface of said spiral spring, and means for pivotally connecting the axis of the spiral spring eccentrically with said oscillating housing.

4. In a shock absorber, a leaf spring, a pair of spiral springs, means for connecting an end of the leaf spring to the inner convolutions of both spiral springs, and oscillatively supported housings in which the outer convolutions of the spiral springs are held.

5. In a shock absorber, a leaf spring, a pair of spiral springs, means for connecting an end of the leaf spring to the inner convolutions of both spiral springs, and oscillatively supported housings in which the outer convolutions of the spiral springs are held, said spiral springs being eccentrically wound and assembled with those parts of the spirals down which are in closest relation to each other.

6. In a shock absorber, a leaf spring, a pair of spiral springs, means for connecting an end of the leaf spring to the inner convolutions of both spiral springs, a link connected with said means, oscillatively supported housings in which the outer convolutions of the spiral springs are held, and means for oscillatively supporting the link from the housings.

7. In a shock absorber, a leaf spring, a pair of spiral springs, means for connecting an end of the leaf spring to the inner convolutions of both spiral springs, a link connected with said means, oscillatively supported housings in which the outer convolutions of the spiral springs are held, a spacer between and secured to the housings and means for oscillatively supporting the link from the spacer.

In witness whereof, I have hereunto set my hand and seal at Indianapolis, Indiana, this 18th day of April, A. D. one thousand nine hundred and seventeen.

ROBERT H. HASSLER. [L. S.]